M. BECK.
FRICTION CLUTCH.
APPLICATION FILED MAR. 24, 1913.
1,132,903.
Patented Mar. 23, 1915.
2 SHEETS—SHEET 2.
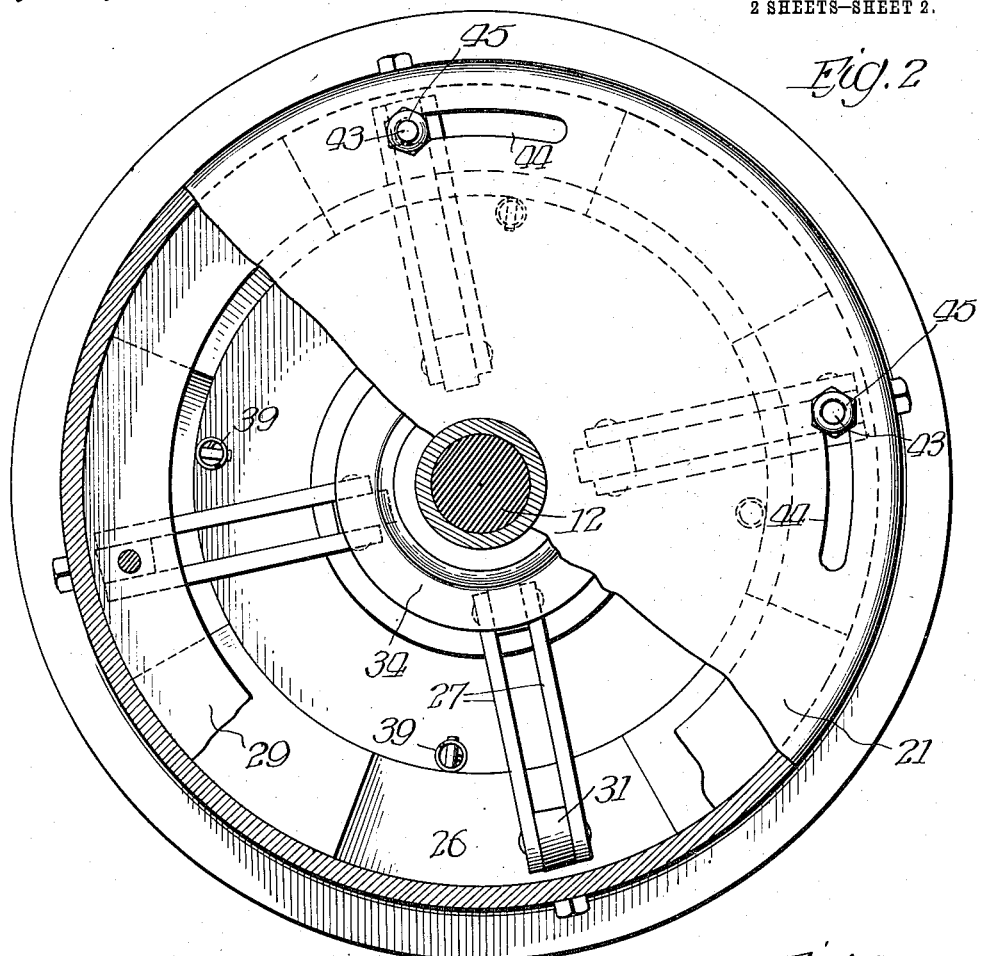
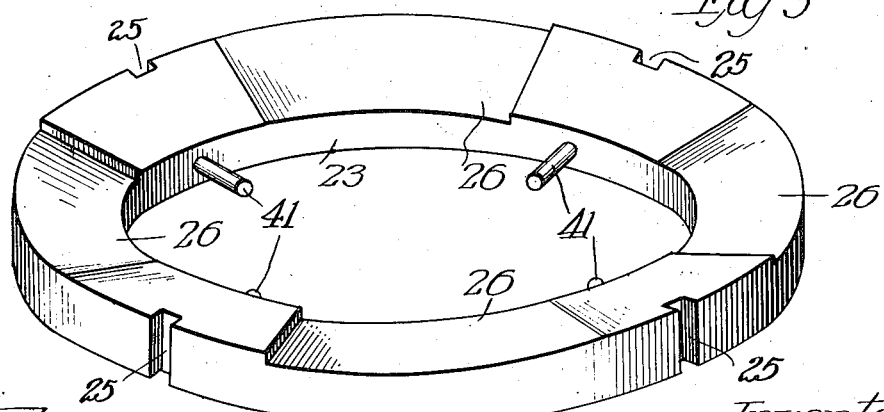
Witnesses:
Inventor
Marshall Beck

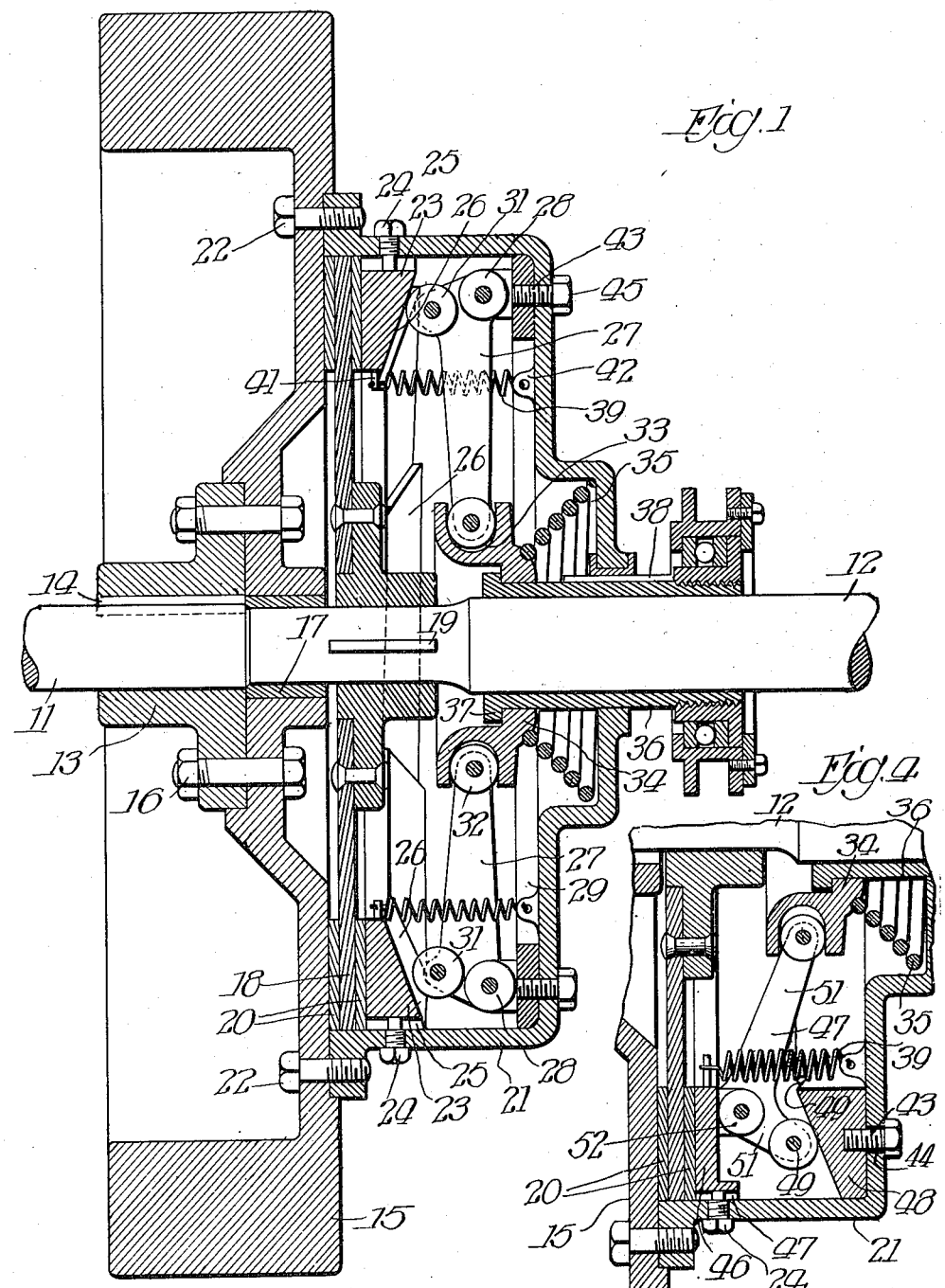

UNITED STATES PATENT OFFICE.

MARSHALL BECK, OF MOLINE, ILLINOIS, ASSIGNOR TO THE BORG & BECK COMPANY, OF MOLINE, ILLINOIS, A CORPORATION OF ILLINOIS.

FRICTION-CLUTCH.

1,132,903.  Specification of Letters Patent.  Patented Mar. 23, 1915.

Application filed March 24, 1913. Serial No. 756,370.

*To all whom it may concern:*

Be it known that I, MARSHALL BECK, a citizen of the United States, residing in Moline, in the county of Rock Island and State of Illinois, have invented certain new and useful Improvements in Friction-Clutches, of which the following is a specification.

This invention relates to friction clutches and has for its object broadly to provide an abutment or take-up device in a friction clutch, which will permit the wearing surfaces of the clutch to be adjusted relatively to each other desired amounts without affecting the efficiency of the clutch or the action of its relatively moving parts.

A further object of the invention is to provide an adjustment or take-up device in a friction clutch which may readily be operated without requiring that any of the parts of the clutch be removed.

Additional objects and advantages of the invention will be apparent as it is better understood from the following description taken in connection with the accompanying drawings illustrating preferred embodiments thereof.

On the drawings:—Figure 1 is a longitudinal sectional view of a clutch embodying my invention; Fig. 2 is an end elevation of the same with parts broken away; Fig. 3 is a perspective view of the thrust ring; and Fig. 4 is a partial sectional view showing a modification of the device shown in Figs. 1 to 3.

Referring to the drawings, 11 designates a driving shaft and 12 the driven shaft. Upon a collar 13 keyed to the driving shaft 11 at 14 is fastened a fly-wheel 15 by bolts or other fastening means 16 so that the fly-wheel, collar and shaft rotate as a single unit and together may be termed the driving element. The shaft 12 is journaled at its end adjacent the shaft 11 in a pilot bearing 17 provided at the center of the fly-wheel 15. Upon the shaft 12 a friction disk 18 is mounted to move longitudinally of the shaft and is caused to rotate with the shaft 12 by a spline 19. A clutch casing 21 is fastened to the fly-wheel by means of bolts 22 and incloses the disk 18. Within the casing 21 a thrust ring 23 is mounted to move longitudinally thereof and is held against rotation relatively to the casing and fly-wheel by means of driving pins 24 threaded into the casing and taking into transverse slots 25 in the periphery of the thrust ring. A friction ring 20 of asbestos or other suitable material is interposed between the adjacent faces of the fly-wheel and friction disk and a similar friction ring is interposed between the adjacent faces of the friction disk and thrust ring. The face of the thrust ring distant from the disk 18 is formed to provide a plurality of thrust seats 26 inclined from their inner to their outer edges to receive the thrusts from the bell cranks to be now described.

A plurality of bell cranks 27, in number equal to the number of seats provided in the thrust ring, are pivotally mounted in lugs 28 upon a yoke ring 29 provided at the rear of the casing. The ends of the arms of each of these bell cranks are preferably but not necessarily provided with rollers 31 and 32, the roller 31 being adapted to press against and roll outwardly over the thrust seats 26 moving the thrust ring 23 toward the fly-wheel and thus bringing the disk, fly-wheel and thrust ring into frictional contact with the friction rings 20 to operatively connect the driving and driven shafts, when the bell cranks are moved from their normal position about their pivotal connections with the ring 29 as will be later described.

The roller 32 is mounted in a suitable groove 33 of a collar 34 which is pressed toward the left, viewing Fig. 1, away from the rear wall of the casing by a spiral expansion spring 35. The collar 34 is mounted upon a clutch throw-out sleeve 36 at the end of which within the casing is provided an outwardly extending flange 37 which is adapted to engage the collar 34 when the sleeve is moved against the force of the spring 35 toward the right, viewing Fig. 1, by any suitable mechanism to throw out the clutch. This sleeve is caused to rotate with the casing and with the driving element by a spline 38 slidably connecting it to the rear wall of the casing. A plurality of springs 39 fastened at one end at 41 to the thrust ring and at the other end at 42 to the rear wall of the casing causes the thrust ring to follow the rollers 31 when the bell cranks are moved to throw out the clutch, whereby the frictional engagement between the thrust ring and the friction disk is immediately broken and the thrust ring is pressed firmly against the rollers 31 so that rattling and shaking of the parts of the clutch are prevented when the clutch is thrown out.

The beveled thrust seats 26 are inclined about the ring 23 from their forward ends in the direction of rotation of the ring to their rear ends and are elongated to permit the rollers 31 to engage desired portions of the seats to adjust the clutch to compensate for wear of the friction rings 20 as will be presently apparent. The ring 29 upon which the bell cranks are mounted is connected to the rear wall of the casing by bolts 43 which extend through arcuate slots 44 in the rear wall and which may be moved lengthwise of the slots to move the ring angularly with respect to the casing and angularly also with respect to the thrust ring to move the rollers lengthwise of the seats 26, sliding them from one portion to the other when it is desired to adjust the parts for wear. When the friction rings 20 are new, the rollers are positioned at the forward or lower ends of the thrust seats. As the rings 20 wear down sufficiently to affect the operation of the clutch the yoke ring 29 is moved angularly about the casing and rearwardly in its direction of travel, sliding the rollers up the inclined thrust seats toward the higher ends and moving thereby the thrust ring toward the fly-wheel until the bell cranks are again able to produce a strong frictional engagement between the driving and driven parts. A nut 45 is provided upon the outer end of each bolt 43 which is adapted to be turned down into contact with the casing to hold the yoke ring and bell cranks in position to maintain the rollers in engagement with the desired portions of the thrust seats. In order that the rollers may slide easily lengthwise of the seats they are preferably made frusto-conical in shape as seen in Fig. 2.

In Fig. 4 is shown a second embodiment of my invention in which the positions of the yoke and thrust rings have been interchanged and the construction of the parts modified accordingly. In this embodiment of the invention the yoke ring 46 is provided with a plurality of transverse slots 47 into which the driving pins 24 take, causing the yoke ring to rotate with the casing and permitting it to move longitudinally thereof. The thrust ring 48 as in the earlier embodiment is provided with a plurality of beveled seats 49 similar in all respects to the beveled seats 26, but inclined from the outer edge to the inner edge of the thrust ring 48 instead of from the inner edge to the outer edge. The bell cranks 51 are pivotally connected to the yoke ring by lugs 52 positioned adjacent the inner edge of this ring and the short arm of each bell crank is disposed when the clutch is thrown out in position to move inwardly across and up the inclined thrust seat when the clutch-shifting mechanism is operated to throw in the clutch. The bolts 43 are fixed to the thrust ring and extend through the slots 44 as hereinbefore described. The operation of the clutch and the take-up device is identical with the operation of the clutch and take-up device described in connection with the earlier embodiment except that the short arms of the bell cranks move inwardly across the thrust seats instead of outwardly as in the construction shown in Figs. 1 to 3.

It will be apparent that as the bell cranks thrust directly against the thrust ring and have no fixed connection therewith or with the throw-out sleeve, they will act with equal efficiency in all of the adjusted positions, and that as the nuts, which are the only parts which must be manipulated in adjusting the clutch, are located without the casing no parts of the clutch need be removed to perform this operation.

It is thought that the invention and many of its attendant advantages will be understood from the foregoing without further description and it will be obvious that numerous changes may be made in the construction and arrangement of the parts without departing from the spirit and scope of the invention or sacrificing any of its advantages, the forms hereinbefore disclosed being merely preferred embodiments thereof.

The operation of the two clutches in the two embodiments shown on the drawing is substantially the same except in the embodiment shown in Fig. 1 the spring 35 through the agency of the collar 34 moves the bell cranks around their pivotal connection with the casing and causes the rollers 31 to press against the adjacent face of the thrust ring. This pressure moves the thrust ring toward the left and engages it with the disk 18 and engages also the disk 18 with the adjacent face of the fly wheel 15. To be exact, this engagement is between the thrust ring, disk and fly wheel and the friction members 20 interposed between these parts. The throw-out sleeve 36 may be moved toward the right to withdraw the levers from engagement and the springs 39 cause the frictional engagement to be broken and cause also the thrust ring to follow the bell cranks toward the right. As the friction members 20 wear away readjustment of the clutch may be made, as already described. In the embodiment shown in Fig. 4 the operation is substantially the same except that the bell cranks are pivoted on the thrust ring and as the thrust ring is moved toward the left to throw in the clutch the rollers 29 roll inwardly across the adjacent faces of the ring 48 secured to the casing 21.

I claim:

1. In a friction clutch, the combination of a driving element, a driven element, a thrust member of varying thickness, means for moving said thrust member, whereby a frictional connection is established between said elements, and means fixed against movement longitudinally of said elements and angularly movable with respect thereto to move said moving means angularly with respect to said thrust member, whereby the relation of said moving means to said thrust member is varied to adjust the parts of the clutch to compensate for wear.

2. In a friction clutch, the combination of a driving element, a driven element, a casing secured to one element and embracing the other element, a thrust member of varying thickness mounted within and rotatable with the casing, means interposed between the rear wall of the casing and said thrust member for moving said thrust member longitudinally of the casing, whereby frictional driving connection is established between said elements, and means held against longitudinal movement of said casing and angularly adjustable with respect thereto to move said moving means angularly with respect to the thrust member, whereby the relation of said moving means to said thrust member is varied to adjust the parts to compensate for wear.

3. In a friction clutch, the combination of a driving element, a driven element, a casing fixed to one of said elements and embracing the other element, a thrust member mounted within and rotatable with the said casing, means for moving the said thrust member to establish frictional engagement between the elements, and means held against movement longitudinally of the casing, disposed through the casing and angularly adjustable relatively to the casing and to the thrust member to compensate for wear of the parts.

4. In a friction clutch, the combination of a driving element, a driven element, a casing secured to one element and embracing the other element, a thrust member mounted within and rotatable with said casing and having a thrust seat of varying depth, a bell-crank mounted within said casing and adapted to engage said seat, and means for moving said bell-crank to engage different portions of said seat to compensate for wear of the parts.

5. In a friction clutch, the combination of a driving element, a driven element, a casing fixed to one element and embracing the other element, a thrust member mounted within and rotatable with the said casing, a bell crank pivoted within the casing and adapted to move the said member longitudinally of the casing to establish frictional engagement between the elements, and means held against movement longitudinally of said casing and angularly adjustable with respect to the said member connecting the bell crank to the casing.

6. In a friction clutch, the combination of a driving element, a driven element, a casing fixed to one element and embracing the other element, a thrust member mounted within and rotatable with said casing having a beveled seat, a bell-crank pivoted within the casing and adapted to engage said seat, and means held against movement longitudinally of the casing and movable angularly of the casing, for altering the throw of said bell-crank to adjust the parts to compensate for wear.

7. In a friction clutch, the combination of a driving element, a driven element, a casing fixed to one element and embracing the other element, a thrust member mounted within and rotatable with said casing and having a beveled seat of varying depth, a bell crank pivoted within the casing and adapted to engage said seat, and means adjustable angularly of the casing for maintaining said bell crank in position to engage a desired portion of said seat.

8. In a friction clutch, the combination of a driving element, a driven element, a casing fixed to one element and embracing the other element, a member mounted within and rotatable with said casing and having a beveled thrust seat of varying depth in its face adjacent the rear wall of the casing, a bell crank pivoted within the casing and adapted to engage said seat and to move the member longitudinally of the casing to establish frictional engagement between the elements, and means disposed through the casing and angularly adjustable with respect to the said member for maintaining the bell crank in position to engage a desired portion of said seat.

9. In a friction clutch, the combination of a driving element, a driven element, a casing fixed to one element and embracing the other element, a thrust member mounted within and rotatable with said casing and having a beveled thrust seat of varying depth in its face adjacent the rear wall of the casing, a bell crank pivoted within the casing and adapted to engage said seat, and means disposed through the said rear wall of the casing and shiftable about its center for maintaining the bell crank in position to engage a desired portion of said seat.

10. In a friction clutch, the combination of a driving element, a driven element, a casing fixed to one element and embracing the other element and having an arcuate slot in its rear wall, a member disposed within and rotatable with said casing and having a beveled thrust seat of varying depth in its face adjacent said rear wall, a bell crank adapted to engage said seat to move the member to establish frictional engagement between the elements, and means connected to the said bell crank and disposed through the slot in the rear wall of the casing for moving the bell crank about the axes of rotation of the casing and member to engage the bell crank with a desired portion of said seat.

11. In a friction clutch, the combination of a driving element, a driven element, a casing fixed to one element and embracing the other element and having an arcuate slot in its rear wall, a member disposed within and rotatable with said casing and having a beveled thrust seat of varying depth in its face adjacent said rear wall, a bell crank adapted to engage said seat to move the member to establish frictional engagement between the elements, and a pivotal mounting for said bell crank disposed through the said slot in the rear wall of the casing and adapted to be moved lengthwise of the slot to angularly adjust the bell crank relatively to said member in position to engage a desired portion of the seat.

12. In a friction clutch, the combination of a driving element, a driven element, a casing fixed to one element and embracing the other element, a member mounted within and rotatable with said casing and having a beveled thrust seat of varying depth in its face adjacent the rear wall of the casing, a bell crank adapted to engage said seat, a ring upon which said bell crank is pivotally mounted, and angularly adjustable means connected to the said ring for maintaining the bell crank in position to engage a portion of said seat of desired depth.

13. In a friction clutch, the combination of a driving element, a driven element, a casing secured to one element and embracing the other element, a member mounted within and rotatable with said casing and having a beveled thrust seat of varying depth in its face adjacent the rear wall of the casing, a bell crank mounted within the casing movable longitudinally of the seat, and a roller of frusto-conical shape fixed to said bell crank and adapted to slide longitudinally of and roll transversely across said seat and means for moving said bell crank longitudinally of the seat.

MARSHALL BECK.

Witnesses:
C. W. BORG,
ALGOT W. ALLISON.